Patented Sept. 30, 1930

1,777,038

UNITED STATES PATENT OFFICE

WILFRID GIBSON, ANTHONY JAMES HAILWOOD, JOSEPH BARON PAYMAN, AND ARNOLD SHEPHERDSON, OF BLACKLEY, MANCHESTER, ENGLAND, ASSIGNORS TO IMPERIAL CHEMICAL INDUSTRIES LIMITED, OF LONDON, ENGLAND

APPLICATION OF NEW NAPHTHALENE DERIVATIVES TO DYE PREPARATIONS

No Drawing. Original application filed August 1, 1928, Serial No. 296,859, and in Great Britain August 29, 1927. Divided and this application filed October 21, 1929. Serial No. 401,362.

A disadvantage commonly met with in aqueous pastes of more or less finely divided material is the tendency to coagulate and settle, so that the paste after being kept for a longer or shorter time is no longer uniform in composition. The addition of gums and other similar thickening material has been proposed, but these have their own special drawbacks such as liability to attack by fungi.

We have now discovered that a polychlorinated naphthalene sulphonic acid and its salts have especially valuable properties in this connection. The addition of 2% of sodium polychloro-naphthalene sulphonate (calculated on the total weight of paste) to an aqueous paste of duranthrene golden orange Y, for example, entirely prevents the settling out of the solid dyestuff, and the paste is found to be practically uniform in composition after standing for a long period of time. This effect is due to the formation of a stiff gel, which however is easily stirrable and thins rapidly when stirred or shaken.

Solutions or pastes containing polychloronaphthalene-sulphonic acid or its salts are not liable to deterioration by fungus growths. Our products have also valuable wetting-out properties.

As long ago as 1849 Laurent (Liebig's Annalen, 72, 300) recorded the fact that the potassium salt of sulphonated tetrachloronaphthalene, when precipitated by water from the alcoholic solution, forms a gel, but hitherto no technical application of this property has been made, and no other salts have been prepared.

The compounds we use are made by sulphonation of a polychloronaphthalene containing 3 to 4, 5 atoms of chlorine in the molecule. The polychloronaphthalene may be obtained by various known methods, particularly by the process described in British application No. 291,849, filed March 4, 1927 (British Dyestuffs Corporation Ltd., Payman & Gibson).

In our copending application Serial No. 296,859, of which the present application is a division, we have described processes of preparing polychlorinated naphthalene sulphonic acid and its salts, from polychloronaphthalene.

In the examples below we describe preferred methods of applying the products, but our invention is not limited to the details there given, either of the particular sulphonating agent used in Example 1 of our co-pending application Serial No. 296,859, or of the exact proportions of the reagents in any of the examples. The parts are by weight.

*Example 1.*—To 100 parts of 12.5% paste of duranthrene golden orange Y, 25 parts of a hot aqueous 10% solution of sodium trichloronaphthalene sulphonate. (The sodium trichloronaphthalene sulphonate may be obtained from polychloronaphthalene containing 3 atoms of chlorine per molecule in the manner shown in Example 1 of our copending application, Serial No. 296,859.) The whole is stirred and allowed to cool. The product is then ready for storage without risk of settling.

*Example 2.*—50 parts of a hot aqueous solution of sodium trichloronaphthalene sulphonate of 10% strength are mixed with 200 parts of an aqueous paste of thioindigo in a fine state of division, containing 25% of the pure dyestuff. The mixture is thoroughly agitated and then allowed to cool, after which it may be stored.

*Example 3.*—200 parts of an aqueous paste of the dyestuff obtained by coupling 1:2:4-dinitroaniline with β-naphthol, containing 25% pure dyestuff are mixed with 50 parts of a hot aqueous 10% solution of sodium trichloronaphthalene sulphonate and the mass allowed to cool; whereupon a paste essentially free from the disadvantage of settling is obtained.

What we claim and desire to secure by Letters Patent is:—

1. An aqueous paste comprising an alkali salt of polychloronaphthalene sulphonic acid containing 3 to 4.5 atoms of chlorine in the molecule, mixed with a substantially insoluble dye and water, the said alkali salt being soluble in hot water to a clear solution which at concentrations above about 1-5% sets on cooling to stirrable gel, the said salt showing in dilute aqueous solutions marked wetting-out and frothing properties.

2. An aqueous paste comprising a polychloronaphthalene sulphonic acid mixed with a finely divided substantially insoluble dye and water.

3. An aqueous paste comprising a trichloronaphthalene sulphonic acid mixed with a substantially insoluble dye and water.

4. In the manufacture of acqueous dye pastes, the process which comprises mixing a substantially insoluble dye with a hot aqueous solution of alkali salt of a polychloronaphthalene sulphonic acid containing 3 to 4.5 atoms of chlorine in the molecule, and then cooling the mixture to form a stiff gel.

5. In the manufacture of aqueous dye pastes, the process which comprises mixing a substantially insoluble dye with a hot aqueous solution of sodium trichloronaphthalene sulphonic acid and then cooling the mixture to form a stiff gel.

6. An aqueous dye paste comprising sodium trichloronaphthalene sulphonic acid mixed with a finely divided substantially insoluble dye, the said paste being a stiff gel which thins rapidly when agitated.

7. An aqueous dye paste comprising a sodium salt of polychloronaphthalene sulphonic acid containing 3 to 4.5 atoms of chlorine in the molecule mixed with a finely divided substantially insoluble dye, the said paste being a stiff gel which thins rapidly when agitated.

8. In the manufacture of aqueous dye pastes, the process which comprises mixing a substantially insoluble dye with a hot aqueous 10 per cent solution of sodium trichloronaphthalene sulphonic acid and then cooling the mixture to form a stiff gel.

In witness whereof we affix our signatures.
WILFRID GIBSON.
ANTHONY JAMES HAILWOOD.
JOSEPH BARON PAYMAN.
ARNOLD SHEPHERDSON.